(12) United States Patent
Wilson, II et al.

(10) Patent No.: US 11,745,360 B2
(45) Date of Patent: Sep. 5, 2023

(54) COMPLIANT INNER LIP ON A VACUUM GRIPPER

(71) Applicant: INTELLIGRATED HEADQUARTERS, LLC, Mason, OH (US)

(72) Inventors: James D. Wilson, II, Collinsville, IL (US); Matthew Brandriff, St. Louis, MO (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 17/074,178

(22) Filed: Oct. 19, 2020

(65) Prior Publication Data

US 2021/0129354 A1 May 6, 2021

Related U.S. Application Data

(60) Provisional application No. 62/928,698, filed on Oct. 31, 2019.

(51) Int. Cl.
*B25J 15/06* (2006.01)
*B65H 67/06* (2006.01)
*B25J 15/04* (2006.01)
*B66C 1/02* (2006.01)

(52) U.S. Cl.
CPC ........... *B25J 15/0683* (2013.01); *B25J 15/04* (2013.01); *B65H 67/065* (2013.01); *B66C 1/0206* (2013.01)

(58) Field of Classification Search
CPC ..... B25J 15/0683; B25J 15/04; B66C 1/0206; B66C 1/0231; B65H 67/065
See application file for complete search history.

(56) References Cited

U.S. PATENT DOCUMENTS

| | | | | | |
|---|---|---|---|---|---|
| 2,177,967 | A | * | 10/1939 | Watkins | ................ B25B 11/007 269/21 |
| 3,152,828 | A | * | 10/1964 | Lytle | ...................... B65G 47/91 294/189 |
| 4,717,138 | A | * | 1/1988 | Watkiss | ............... B65H 3/0883 271/103 |
| 4,787,812 | A | * | 11/1988 | Gopfert | ................. B66C 1/0212 414/737 |

(Continued)

FOREIGN PATENT DOCUMENTS

GB 2 167 726 * 6/1986

*Primary Examiner* — Dean J Kramer
(74) *Attorney, Agent, or Firm* — Alston & Bird LLP (57) ABSTRACT

Various embodiments disclosed herein provide for a lip assembly for a vacuum gripper or suction device that is designed to work well with both soft flexible packages and articles with rigid surfaces. The lip assembly can have a compliant or flexible inner lip that soft packages can blossom over when suction is applied, while the outer lip of the lip assembly is also suited to working with hard, rigid packages. The vacuum gripper can be mounted on an end of arm tool of a robotic arm and can therefore be configured to work with a wide variety of packages and package types. The small footprint achieved by having a single vacuum gripper that is able to work with both types of packages enables a better opportunity to pick individual packages at one time and maintain a grasp on the package during medium to high-speed transport.

7 Claims, 6 Drawing Sheets

(56) References Cited

U.S. PATENT DOCUMENTS

| | | | | |
|---|---|---|---|---|
| 5,639,553 | A | * | 6/1997 | Nagai .................... B65G 47/91 |
| | | | | 525/329.3 |
| 6,437,560 | B1 | * | 8/2002 | Kalb .................... B25B 11/007 |
| | | | | 248/363 |
| 6,607,054 | B1 | * | 8/2003 | Lindfield ............. F16B 47/006 |
| | | | | 248/205.8 |
| 7,823,940 | B2 | * | 11/2010 | Verhoeven ............ B65G 47/91 |
| | | | | 294/183 |
| 2012/0319416 | A1 | * | 12/2012 | Ellis .................... B25J 15/0616 |
| | | | | 294/183 |
| 2016/0096278 | A1 | * | 4/2016 | Cho ....................... F16B 47/00 |
| | | | | 294/185 |
| 2020/0262087 | A1 | * | 8/2020 | Douglas ............... B25J 15/0691 |
| 2020/0353629 | A1 | | 11/2020 | Simons et al. |

* cited by examiner

COMPLIANT INNER LIP ON A VACUUM GRIPPER

PRIORITY

This application is a non-provisional conversion application of and claiming the benefit of priority to U.S. Provisional Patent Application Ser. No. 62/928,698 entitled "COMPLIANT INNER LIP ON A VACUUM GRIPPER" filed on Oct. 31, 2019, the entirety of which is incorporated by reference herein.

TECHNICAL FIELD

The present application relates generally to a vacuum gripper comprising an outer lip and an inner, compliant lip for gripping thin non-rigid surfaces in a material handling environment.

BACKGROUND

Generally, in a material handling environment, a material handling system must convey, handle, sort, and organize various types of items (e.g. cartons, cases, containers, shipment boxes, totes, packages, polybags, jiffy packaging, and/or the like). Traditionally vacuum grippers and suction devices are designed to either work with items that have soft flexible packaging, or hard surfaces. The design choices for one type of package often make it difficult to work with the other type of package.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details.

Various embodiments disclosed herein provide for a lip assembly for a vacuum gripper or suction device that is designed to work well with both soft flexible packages and articles with rigid surfaces. The lip assembly can have a compliant or flexible inner lip that soft packages can blossom over when suction is applied, while the outer lip of the lip assembly is also suited to working with hard, rigid packages. The vacuum gripper can be mounted on an end of arm tool of a robotic arm and can therefore be configured to work with a wide variety of packages and package types. The small footprint achieved by having a single vacuum gripper that is able to work with both types of packages enables a better opportunity to pick individual packages at one time and maintain a grasp on the package during medium to high-speed transport.

In an embodiment, a vacuum gripper or a suction device can include a main body and a lip assembly attached to the main body, wherein the lip assembly comprises an inner lip that extends into a cavity formed by the lip assembly and the main body, wherein a diameter of an inner surface of the main body is greater than a diameter of an opening formed by the inner lip of the lip assembly. The suction device can grasp rigid packages using an outer lip which can be formed of a first less compliant or flexible material, and soft, flexible packages such as poly bags which can blossom using the inner lip which can be formed of a second more compliant or flexible material. The packages come into contact with a top surface of the inner lip in the cavity formed by the lip assembly and the main body which can facilitate grasping of the packages.

In an alternate embodiment, an insert and top and side members of the main body can bound the main body and the inner lip assembly to form a cavity, and the insert can work in conjunction with the cavity to assist in holding soft packages.

In yet another embodiment, the inner lip surface can be formed of a less flexible material than a second material of the outer lip surface. The packages with soft, flexible surfaces can be grasped by the outer lip surface made of a flexible material and then come into contact with the top surface of the inner lip in the cavity to enable grasping of the packages.

In yet another embodiment, the inner lip can be at least one of a silicone, urethane, or engineering grade rubber/elastomeric resin. The lip assembly can also be detachably attached to the main body.

In yet another embodiment, a plurality of suction devices having a lip assembly with an inner lip and an outer lip can be attached to an end effector of a robotic manipulator. The plurality of suction devices can be attached to a rotatable, circular disc coupled to the end effector of the robotic manipulator. In another embodiment, each suction device of the plurality of suction devices can be individually actuated while handling a variety of packages having either hard or pliant surfaces. In yet another embodiment, each suction device of the plurality of suction devices can be equidistant from each other in a radial direction throughout the diameter of the rotatable, circular disc coupled to the end effector of the robotic manipulator. In yet another embodiment, distance between each of the plurality of suction devices can be dynamically adjusted in the radial direction throughout the diameter of the rotatable, circular disc.

The suction devices that are attached to an end of a robotic manipulator conventionally have different designs depending on whether the surface to be picked is a hard surface or a flexible surface. This limitation can pose a serious challenge in material handling environments, where a wide variety of packages are brought in constantly and need to be processed in short intervals of time. In such situations, the processing load can increase to dangerously high levels and affect the overall working and efficiency of the material handling environment. Employing robotic manipulators with specific end-effectors for specific types of package surfaces is a cumbersome and inefficient solution as it would involve constantly switching the type of robotic manipulator being used depending on the type of incoming package. Another solution is to switch the type of end-effector attached to a single robotic manipulator based on the type of package surface, however this can lead to excessive wear and tear while using the robotic manipulator.

Figure 1:
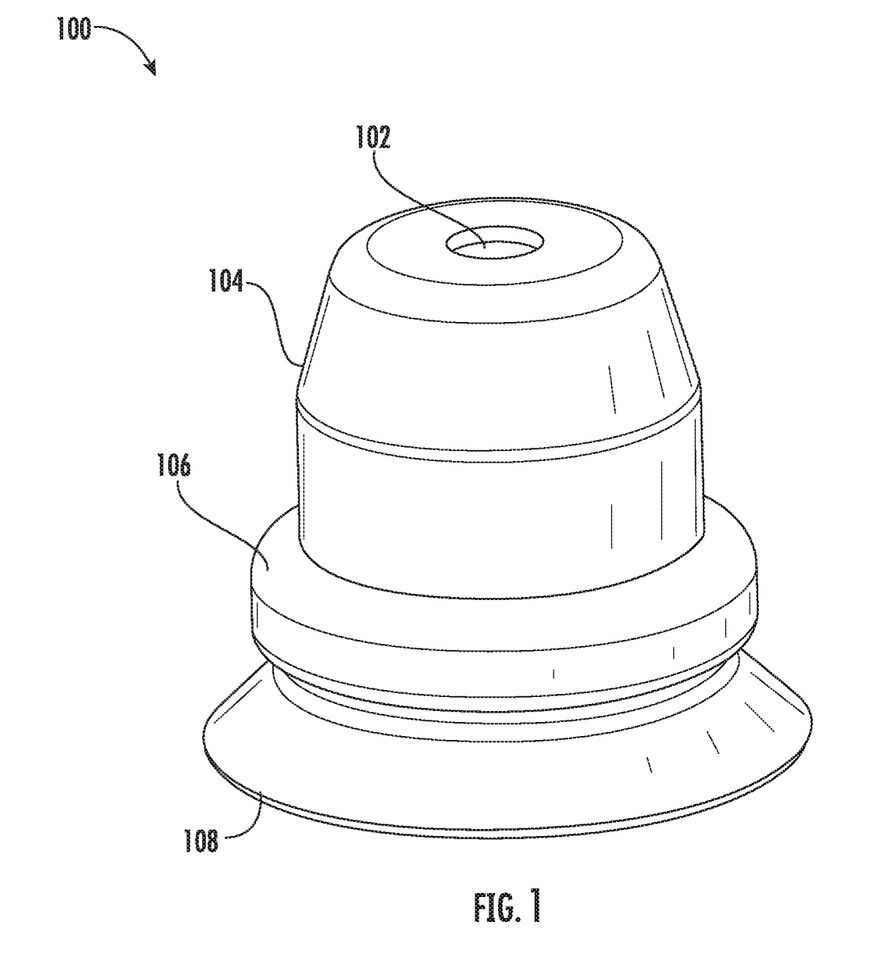
FIG. 1 illustrates an exemplary perspective view of a vacuum gripper in accordance with various aspects and embodiments of the subject disclosure.

Turning now to FIG. 1, illustrated is an exemplary perspective view of a suction device in accordance with various aspects and embodiments of the subject disclosure. The suction device 100 can be attached to an end effector of a robotic manipulator using a rotatable, circular disc. The suction device 100 can be actuated to move in a horizontal axis 'X' and a vertical axis 'Y' during the rotation of the rotatable, circular disc to perform a picking and placing operation. In some embodiments, a movable carriage can be attached to the rotatable, circular disc to facilitate movement of the suction device 100. In some examples, the movable carriage can be conveyed on profiled rail guides with integrated rack & pinion assemblies driven by one or more motors. The movable carriage can include a pair of wheels that engage the profiled rail guides to facilitate movement of the movable carriage. The movable carriage can slide from an outer end of the rotatable, circular disc to an inner end of the disc with respect to the center of the disc, as such imparting forward and backward linear movement of the suction device 100. In some embodiments, the suction device 100 can be detachably coupled to the movable carriage. In some examples, the movable carriages can include either a permanent magnet or electromagnet which can holds the suction device 100 by means of a magnetic force. In some examples, the movable carriage can include provisions to mate with the suction device 100 via an interference or friction fit. In this regard, the suction device 100 can be easily replaced or removed. In some embodiments, the suction device 100 can use pneumatic cylinders or hydraulic cylinders to accomplish the forward and backward linear movement of the suction device 100. For example, during a picking operation, the suction device 100 can be extended away from the rotatable, circular disc and during a placing operation, the suction device 100 can be retracted towards the rotatable, circular disc. The suction device 100 can be positioned at an initial position proximate to an outer edge of the circular disc. The suction device 100 can be moved from an initial position to intermediate positions and then to a final position proximate to the center of the circular disc. In this regard, dimensions of the article can be considered for repositioning the suction device 100. A suction device 100 can have a main body 104 with a collar 106 that enables a lip assembly 108 to be attached to the main body. The collar 106 can include a cavity into which a top portion of the lip assembly 108 can be inserted and locked into. The main body 104 can also include a cavity portion 102 through which the gripper 100 can be attached to an end of a robotic arm and through which pipes and or other means of applying suction to the suction device 100 can be facilitated. The lip assembly 108 can be configured to work with items and/or articles with rigid surfaces as well as soft flexible packaging via an inner lip (e.g., 206, shown in FIG. 2).

In some embodiments, sensors, such as laser range finder sensors, photo eye, and camera can be attached to the suction device 100 to identify the type of package to be picked by the suction device 100 and to determine a distance at which the articles are positioned relative to the suction device 100. For example, in some embodiments, a laser range finder or a proximity sensor can determine the distance between a top surface of a package and a first end of the suction device 100. In some examples, the type of package can be dynamically computed by a central controller based on images from vision sensors positioned on the suction device 100. Based on the determined distance, the central controller can cause the robotic manipulator to position the suction device 100 in different operating positions.

According to another embodiment, a vacuum switch can be provided to detect vacuum supplied to the suction device 100. Output from a vacuum generator can be coupled through the vacuum switch to the suction device 100. Whenever vacuum is applied to the suction device 100, the vacuum switch can output a signal when a suction is made between the suction device 100 and the surface of a package. The output from the vacuum switch can be utilized by the central controller to move the suction device 100 along with the package.

Figure 2:
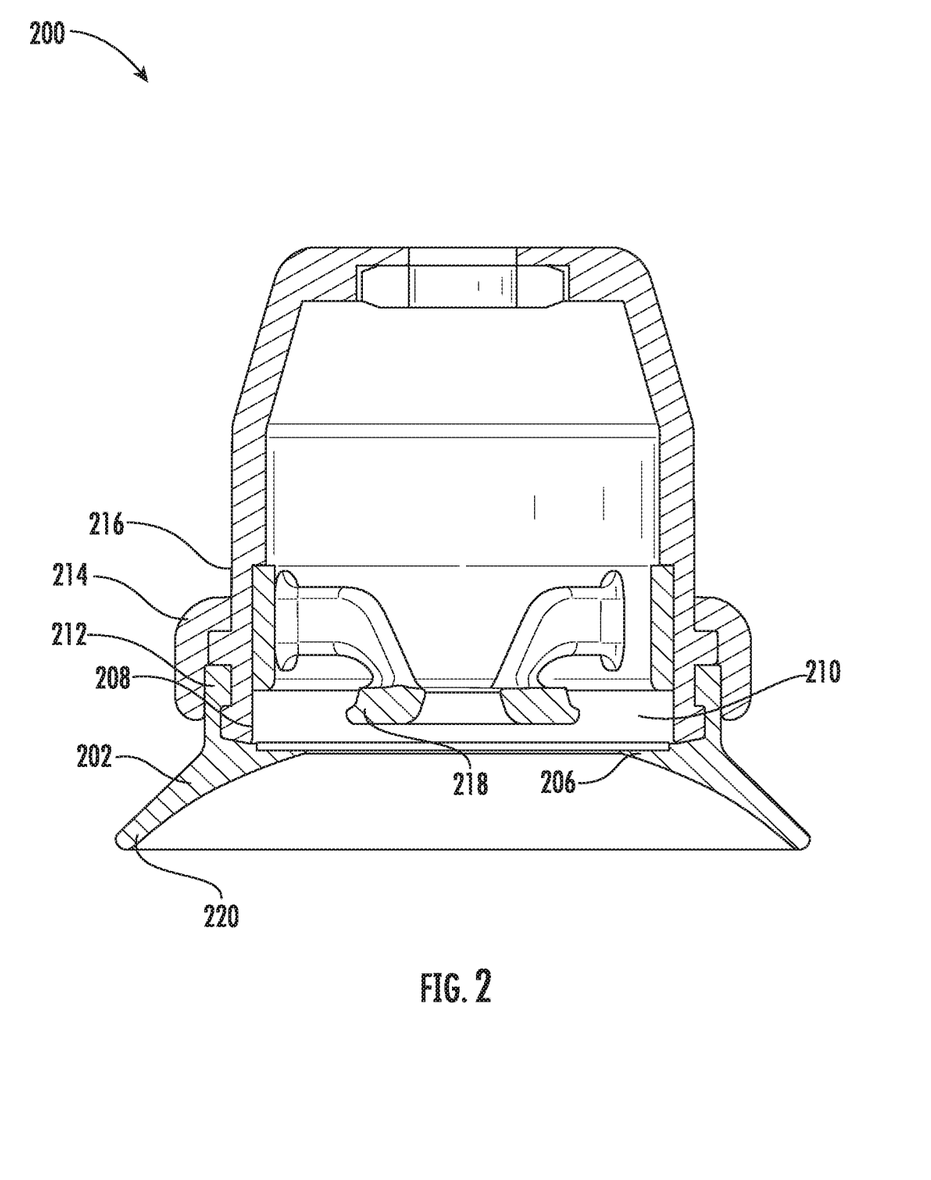
FIG. 2 illustrates an exemplary cutaway side view of a vacuum gripper in accordance with various aspects and embodiments of the subject disclosure.

Turning now to FIG. 2, illustrated is an exemplary cutaway side view of a suction device 200 in accordance with various aspects and embodiments of the subject disclosure. A top portion 212 of lip assembly 202 can be inserted into a cavity formed between the collar 214 and a main body 216 to secure the lip assembly. The main body 216 and the inner lip 206 of the lip assembly 202 can form a cavity 210 that is bounded on the top and sides by the main body and insert 218, a portion of the bottom can be bounded by the inner lip 206 of the lip assembly 202. A diameter of the inner surface wall of the main body 208 can be greater than a diameter of an opening formed by the inner lip 206. The lip assembly 202 can also include the outer lip 220 that is configured to facilitate grasping hard and/or rigid objects or articles.

The suction device 200 can grasp rigid packages via the outer lip 220, and soft, flexible packaging (e.g., poly bags, etc.) can blossom over the inner lip 206 and come into contact with a top surface of the lip in the cavity 210 and/or the insert 218, either of which can facilitate grasping soft packages.

In some embodiments, the suction device 200 can comprise of at least two detachable lip assemblies formed by a first material and a second material which can be attached to the suction device 200 based on the type of package being picked and placed by the suction device 200.

In some other embodiments, the lip assembly can have an electrostatic adhesive surface in order to engage articles having a polymer or resin surface. In some other embodiments, the lip assembly can be formed of an electromagnetic surface to engage packages using electromagnetic attraction.

In some embodiments, additional vacuum rods can be present along the sides of the robotic manipulator to engage a package that has a large surface area, such that the vacuum rods access the package from the sides along with the suction device 200 which picks the package from the middle to provide greater flexibility and efficiency. In an embodiment, a central controller can selectively activate and deactivate the vacuum rods based on the surface area of the package.

Figure 3:
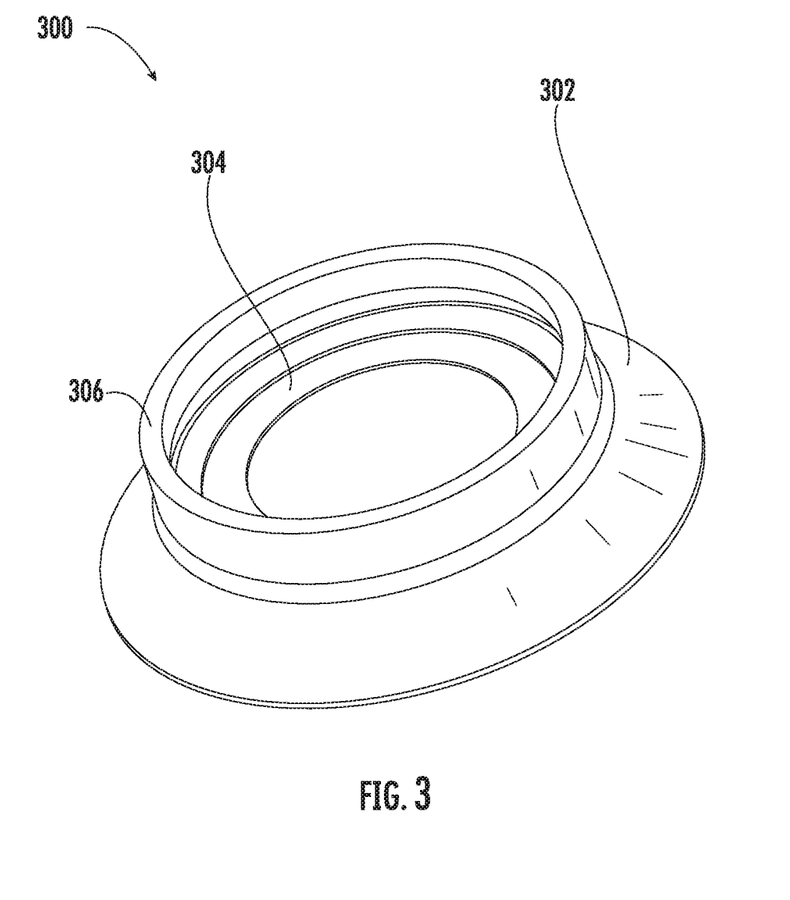
FIG. 3 illustrates an exemplary perspective view of a lip assembly with an outer lip and an inner lip in accordance with various aspects and embodiments of the subject disclosure.

Turning now to FIG. 3, illustrated is an exemplary perspective view of a lip assembly with an inner lip in accordance with various aspects and embodiments of the subject disclosure. The inner lip 304 of lip assembly 300 can be seen along with outer lip 302 that is configured to grasp hard/rigid items. The inner lip 304 can allow soft packaging to billow or blossom over the top side of the lip 304 to enable the vacuum cup to grasp both rigid and soft articles. The top portion 306 of the lip assembly can also be seen which can be attached to the main body of the grasper/suction device.

Figure 4:
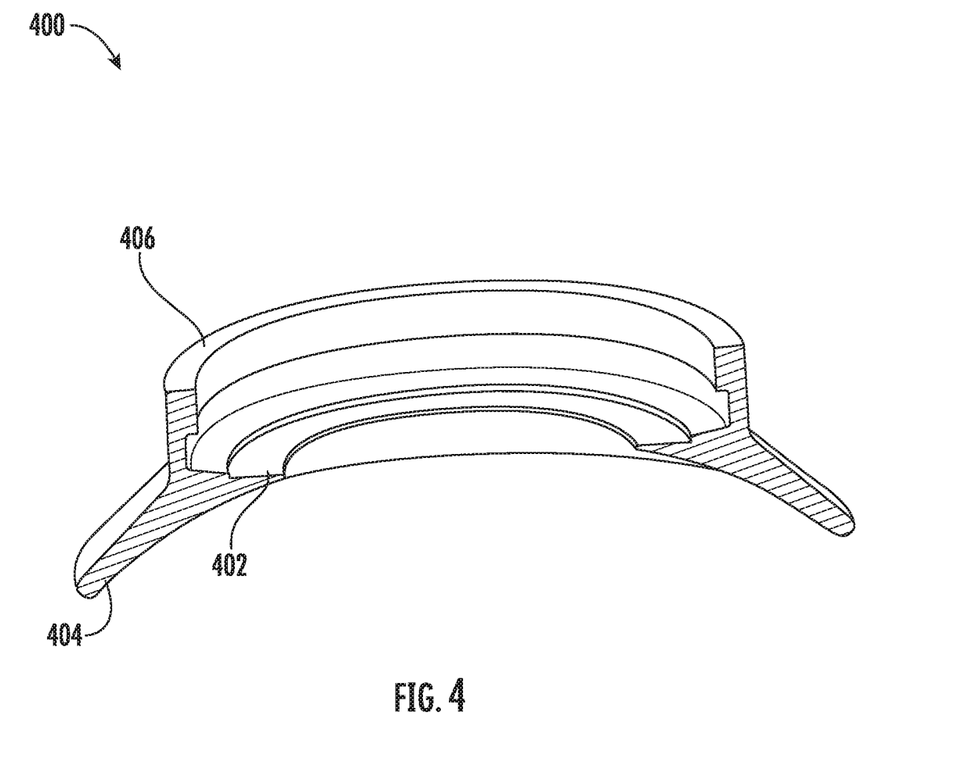
FIG. 4 illustrates an exemplary cutaway side view of a lip assembly with an inner lip and outer lip in accordance with various aspects and embodiments of the subject disclosure.

Turning now to FIG. 4, illustrated is an exemplary cutaway side view of a lip assembly with an inner lip in accordance with various aspects and embodiments of the subject disclosure. In this view, the inner lip 402 is shown again in comparison to the outer lip 404 and top portion 406 of the lip assembly 400.

Figure 5:
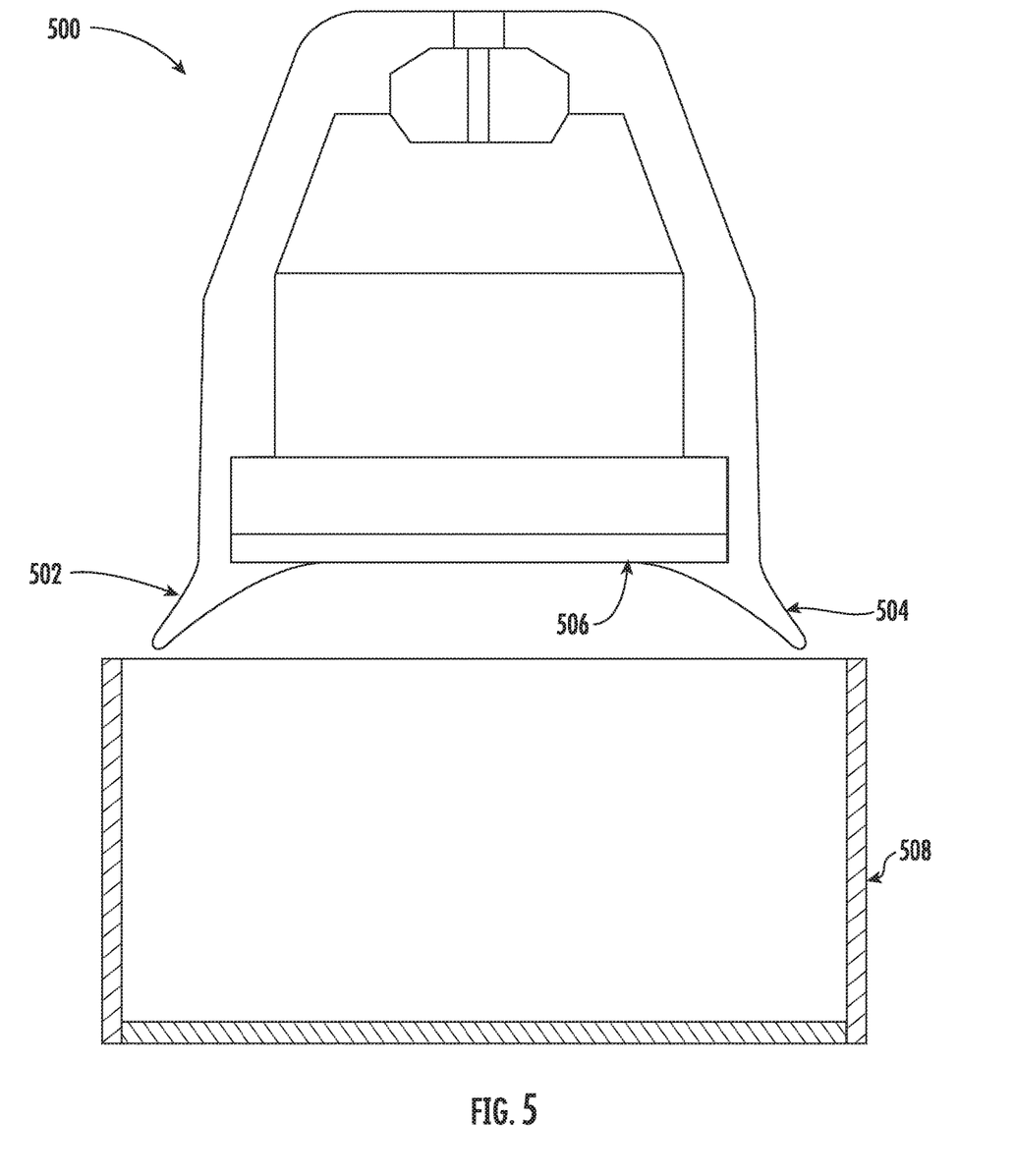
FIG. 5 illustrates an exemplary cutaway front view of a suction device picking up an item with a hard surface, such as a carton, comprising a lip assembly an inner lip and outer lip in accordance with various aspects and embodiments of the subject disclosure.

Turning now to FIG. 5, illustrated is an exemplary cutaway side view of a suction device 500 picking up an object 508 having a hard surface, such as a carton. The suction device 500 has a lip assembly 502 with an inner lip 506 and an outer lip 504. The suction force generated by the suction device 500 allows the outer lip 504 of the suction device 500 to pick the object 508 from its location.

Figure 6:
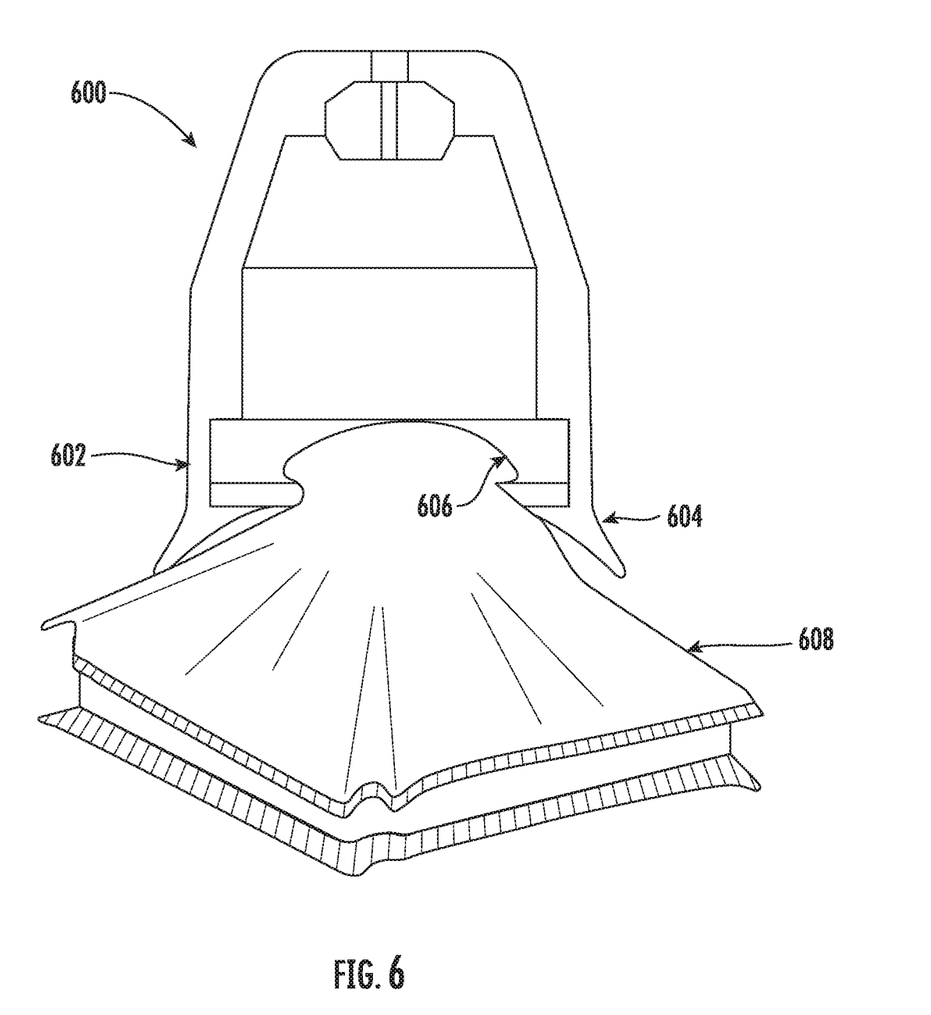
FIG. 6 illustrates an exemplary cutaway front view of a suction device picking up an item with a flexible surface, such as a polybag, comprising a lip assembly an inner lip and outer lip in accordance with various aspects and embodiments of the subject disclosure.

Turning now to FIG. 6, illustrated is an exemplary cutaway side view of a suction device 600 picking up an object 608 having a flexible surface, such as a polybag. The suction device 600 has a lip assembly 602 with an inner lip 606 and an outer lip 604. The surface of the object 608 which comes in contact with the inner lip 606 of the suction device 600 blossoms over the inner lip 606 due to suction force generated by the suction device 600, which allows the object 608 to be picked.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method comprising:
gripping one or more types of packages using a suction device attached to an end of robotic manipulator, the suction device comprising:
a main body;
a lip assembly attached to the main body, wherein the lip assembly comprises:
an outer lip;
an inner lip; and
a collar attached to the main body that defines a first cavity into which a top portion of the inner lip is inserted and locked,
wherein a bottom portion of the inner lip in a second cavity and the outer lip are configured to grasp a package such that a surface of the package contacts an inner surface of the inner lip inside the second cavity, and
wherein a diameter of an inner surface of the main body is greater than a diameter of an opening formed by the inner lip of the lip assembly, and
wherein the inner lip is formed of a first material more flexible than a second material of the lip assembly surface.

2. The method of claim 1, wherein the inner lip is formed of a rubber compound.

3. The method of claim 1, wherein the inner lip is formed of a silicone compound.

4. The method of claim 1, wherein the inner lip is formed of a urethane compound.

5. The method of claim 1, wherein the lip assembly is detachably attached to the main body.

6. The method of claim 1, wherein packages with irregular surfaces blossom over the inner lip of the lip assembly.

7. The method of claim 1, wherein the outer lip of the lip assembly is configured to grasp packages with rigid surfaces.

* * * * *